United States Patent [19]

Westbrook

[11] 3,942,112
[45] Mar. 2, 1976

[54] ROTARY SEAL SHAFT ROTATION TRANSDUCER

[76] Inventor: Carl M. Westbrook, 719 N. Hill Road, Beloit, Wis. 53511

[22] Filed: May 6, 1974

[21] Appl. No.: 467,476

[52] U.S. Cl. .............................. 324/166; 324/175
[51] Int. Cl.² ...................... G01P 3/48; G01P 3/36
[58] Field of Search ............ 324/175, 166, 167, 173, 324/174; 73/194 E

[56] References Cited
UNITED STATES PATENTS

| | | | |
|---|---|---|---|
| 3,622,801 | 11/1971 | Stone | 324/175 X |
| 3,710,618 | 1/1973 | Pagel | 73/136 A |
| 3,821,896 | 7/1974 | Grob | 324/175 X |

FOREIGN PATENTS OR APPLICATIONS

| | | | |
|---|---|---|---|
| 1,174,093 | 7/1964 | Germany | 324/175 |

Primary Examiner—Alfred E. Smith
Assistant Examiner—Rolf Hille
Attorney, Agent, or Firm—Larson, Taylor & Hinds

[57] ABSTRACT

The invention relates to a device for signalling the rotational displacement or speed of a shaft provided with a rotary seal through which a gas or liquid is induced into a bore within the shaft. More particularly, the invention relates to a novel device in which the operative elements of a rotary seal and a rotational transducer are combined as a compact unitary assembly that is simple, reliable and easily serviced.

9 Claims, 6 Drawing Figures

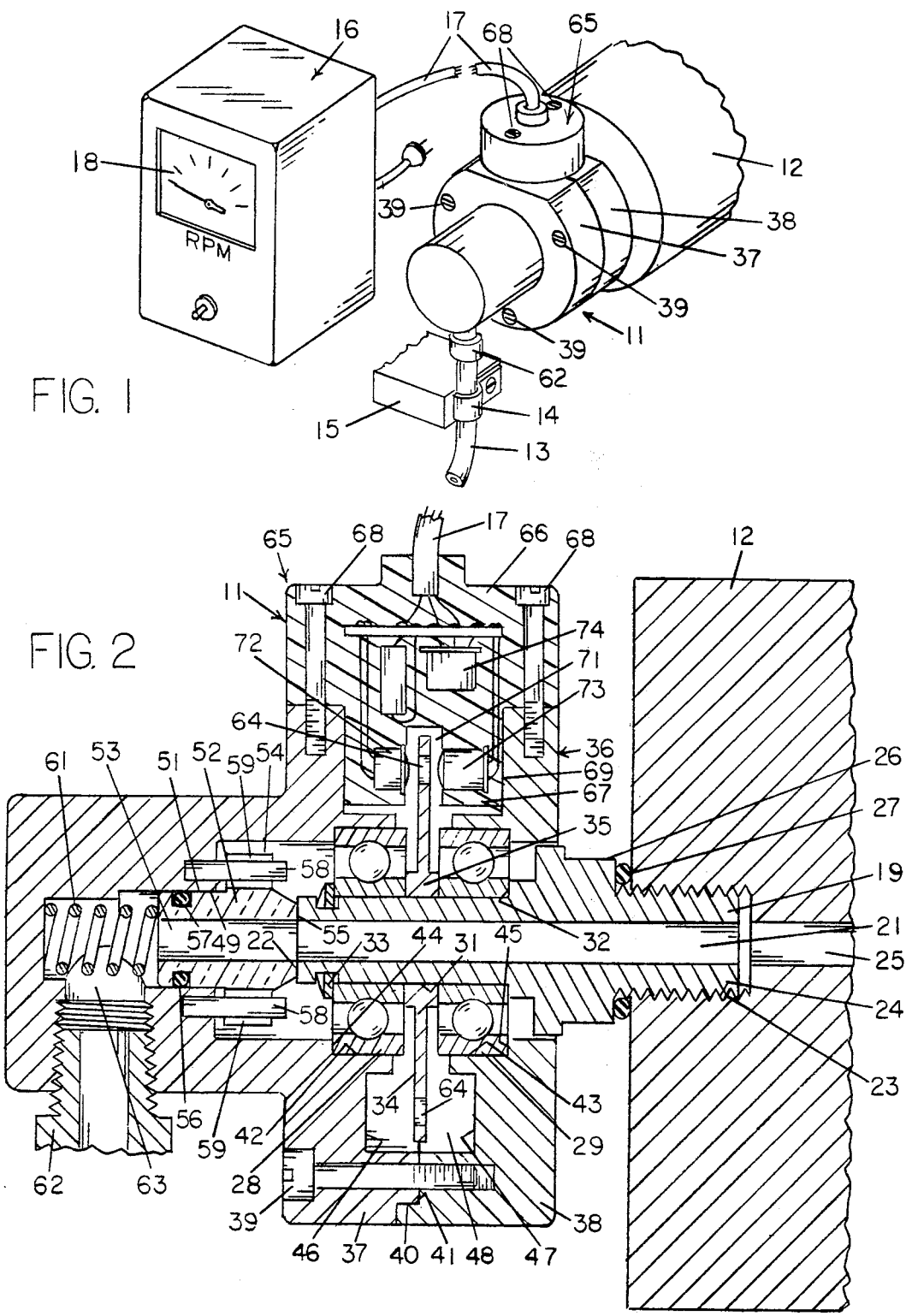

ROTARY SEAL SHAFT ROTATION TRANSDUCER

BACKGROUND OF THE INVENTION

Many industrial applications require the use of a transducer device to monitor the rotational speed or angular displacement of a rotational shaft that is also provided at one end with a rotary gland or seal through which a liquid or gas is introduced into a passageway within the shaft. With previously known seal and rotational transducer components, this dual requirement of motion sensing and gas or liquid induction dictates the use of separate transducer and seal units, each of which included its own bearings, housing and rotation resisting means. Furthermore, the necessity of mounting the seal at the center of an accessible end of the shaft often requires the use of a more expensive type of transducer unit than would be needed if the latter unit could occupy that position. Additionally, presently available transducer units otherwise suitable for such applications are often relatively complex and delicate and hence are not well-suited for convenient servicing in the field.

SUMMARY OF THE INVENTION

The principal object of the present invention is to provide a simple, reliable and relatively inexpensive device for producing a signal indicative of angular displacement or rotational speed, of a shaft that requires a rotary gas or liquid seal at one end thereof. Another object of the invention is to provide such a device which is readily adaptable to shafts adapted to use conventional rotary seals and which is compatible with conventional rotational displacement or speed readout instrumentation. Yet another object of the invention is to provide such a device capable of being assembled from one set of basic components in combination with different types of transducer units.

Briefly, these and other objectives are accomplished in accordance with the present invention by means of a novel dual function device combining the operative elements of a rotation transducer and a rotary seal in a unitary assembly adapted to be substituted for a conventional rotary seal. The housing of the device contains and supports the stationary elements of both the seal and the transducer unit and is carried by bearings mounted on a rotative tubular spindle through which gas or liquid is introduced into a shaft passageway. This spindle, which is affixed to the shaft in coaxial relation thereto, supports the rotative elements of the seal and a rotative armature member. The stationary sensing element of the transducer unit is supported by the housing in cooperative proximity to the rotatable armature member and produces an electrical output signal functionally related to the rotational position or speed of the shaft. Preferably, the sensing element is an integral sub-assembly that can be removed from the device without further disassembly of the latter.

Different types of armature members and corresponding sensing elements can be installed in the dual function device without modification of other elements thereof; thus allowing the device to be manufactured conveniently and economically with various types of transducers, etc..

Various means for practicing the invention and other advantages and novel features thereof will be apparent from the following detailed description of an illustrative preferred embodiment of the invention, reference being made to the accompanying drawings in which like reference numerals denote like elements.

IN THE DRAWINGS

FIG. 1 is a perspective view of a preferred embodiment of the present invention comprising a dual function rotary seal and rotation transducer device shown attached to one end of a partially depicted rotative shaft and connected to a rotational speed readout instrument;

FIG. 2 is an enlarged cross sectional elevational view of the device shown in FIG. 1, embodying a sensing unit comprising a light source and a photocell at opposite sides of a perforated opaque armature member;

Figure 3:
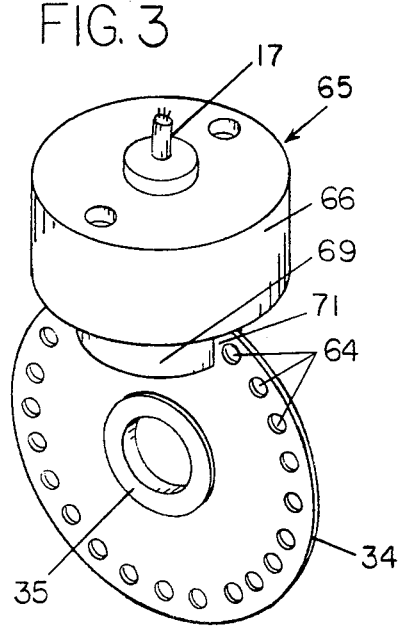
FIG. 3 is a perspective view of the sensing unit and armature member shown in FIG. 2, depicting those components in operative relation to each other.
Figure 5:
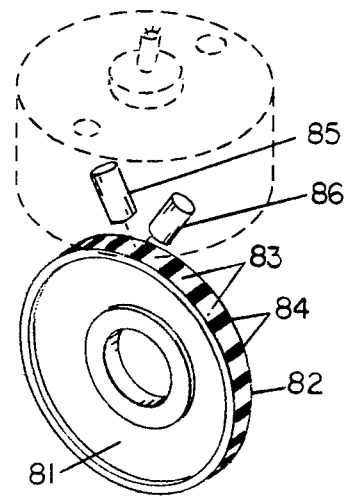
Figure 6:
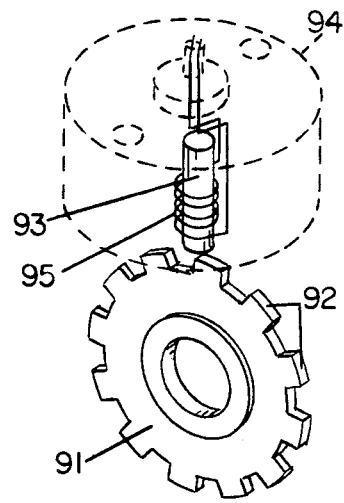

FIG. 5 illustrates an alternative form of armature member and sensing unit which employs reflective optical sensing of alternate reflective and absorbent areas spaced about the periphery of the armature member; and FIG. 6 corresponds generally to FIGS. 3 and 5 but depicts a transducer comprising an electromagnetic sensing unit that cooperates with a peripherally toothed magnetically permeable armature member.

DESCRIPTION OF THE ILLUSTRATIVE PREFERRED EMBODIMENT

Referring to the accompanying drawings, FIG. 1 illustrates a preferred embodiment of the invention comprising a dual function rotary seal and rotation transducer device 11 attached to one end of a partially depicted rotative shaft 12. A flexible tube 13 connects the device to a fluid system, not shown, to conduct a liquid or gas into or out of a passageway in shaft 12. As shown at numeral 14 a clamp anchors the tube 13 to a stationary support structure 15 so that the tube also serves to prevent the device from rotating. A tachometer readout instrument 16 is also connected to the device of a flexible electrical cable 17 to provide a continuous indication of rotational shaft speed by means of meter 18. Alternatively, a similar readout instrument could be used in conjunction with the same device to indicate angular changes in rotative shaft position or to sense initiation or termination of shaft rotation.

By reference to FIGS. 1 through 4, and particularly FIG. 2, the subject dual function device will be seen to comprise a tubular spindle 19 provided with a central passageway 21 and with a flat hardened end face 22. At its opposite end, the spindle includes a threaded section 23 adapted to be screwed into the mating threads 24 at the end of axial passageway 25 in shaft 12. A hexagonal section 26 of spindle 19 allows a wrench to be used to screw the spindle into tight engagement with the shaft and also provides a shoulder for an "0" ring 27 or a similar gasket that insures leak tight communication between shaft passageway 25 and spindle passageway 21.

A pair of ball bearings 28 and 29 are carried by a mating cylindrical surface 31 of spindle 19 between spindle shoulder 32 and a bowed retainer clip 33 that resiliently biases the inner race of bearing 28 toward bearing 29. An armature disk 34, described in greater detail below, is also supported by spindle surface 31 with its thickened hub 35 tightly sandwiched between the two inner bearing races by clip 33. Because of this thickened hub, the remainder of the disk is spaced from the outer bearing races so that the disks can rotate freely with the spindle.

The housing 36 of the device comprises a first body member 37 and a second body member 38, which are separably held together by screws 39 and maintained in accurate coaxial alignment with each other by mating circumferential shoulders 40 and 41. Mutually aligned cylindrical bearing surfaces 42 and 43 in respective body members 37 and 38 receive the outer races of the corresponding bearings 28 and 29, which are sandwiched between end faces 44 and 45 of the body members. Beyond bearing surfaces 42 and 43, the body members are provided with confronting annular slots 46 and 47 which define an annular chamber 48 that accommodates the periphery of armature disk 34. Accordingly, it will be apparent that the housing 36 is supported from the spindle by the ball bearings so that the housing can remain stationary while the shaft, the spindle and the armature disk rotate.

An axial bore 49 in body member 37 slidably receives the cylindrical shank 51 of a carbon seal member 52, which includes a central passageway 53, a peripheral flange 54, and an absolutely flat end face 55. An "0" ring 56 is received in an annular groove 57 encircling seal member shank 51 and fits tightly within body member bore 49 to establish a leak tight fit. A pair of pins 58 are received loosely in corresponding slots 59 in the seal member flange 54 to prevent relative rotation between the seal member and the body member. Spring 61 biases seal member 52 against spindle 19 to maintain their respective flat end faces 55 and 22 in leak tight engagement; thereby establishing fluid communication through the device between the shaft passageway 25 and tube 13, which is connected to the device by an appropriate fitting 62 threaded into lateral body member passageway 63 in communication with passageway 53 in seal member 52.

As shown at numeral 64 in FIGS. 2 and 3, armature disk 34 is provided near its periphery with a circular row of holes or apertures. The sensing element 65 that cooperates with the armature is in the form of an integral sub-assembly comprising a plastic body member 66 partially received in a radial bore 67 along the intersection of the two body members 37 and 38 and removably held in place by screws 68; the smaller cylindrical portion 69 of body member 66 extending into bore 67 is provided with a slot 71 that accommodates the apertured edge of the armature disk 34 between a light emitting diode 72 or the equivalent and a phototransistor 73 supported by member 66 at opposite sides of the disk. Accordingly, light emitted by diode 72 and detected by phototransistor 78 is intermittently interrupted by disk 34 at a frequency proportional to the rotational speed of shaft 12.

Figure 4:
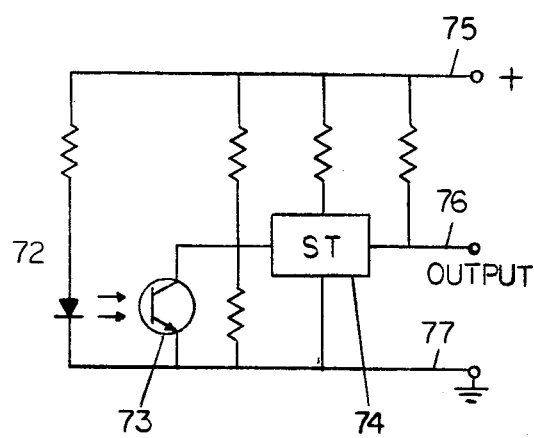
FIG. 4 is a schematic drawing of the electrical circuitry incorporated in the sensing unit shown in FIGS. 2 and 3.

The relatively conventional electrical circuit of the sensing element, shown in FIG. 4, includes light emitting diode 72 and phototransistor 73 in cooperation with various resistors and an integrated Schmidt Trigger circuit 74 that converts the analog form output signal of the transistor into a square wave form compatible with the readout instrument. Preferably, this Schmidt Trigger circuit is incorporated directly in body member 66, which is hermetically sealed by a conventional "potting" technique to insure durability and longevity. The power supply for the sensing element is incorporated in the readout instrument 16, which is connected to leads 75, 76 and 77 comprising flexible electrical cable 17. Details of the readout instrument have been omitted in the interest of brevity and clarity inasmuch as such instruments for converting a frequency modulated signal into a functionally related meter or digital readout are well known in the prior art and are readily available in the commercial market. The readout instrument can be adapted to display the shaft rotation speed in various units such as revolutions per minute, radians per second, etc., or similar instrument can be employed in conjunction with the same sensing element to indicate angular positions or displacements of the shaft or to signal initiation or termination of shaft rotation.

The embodiment of the invention shown in FIG. 5 is basically similar to the embodiment disclosed above except that in this case the armature disk 81 is provided with a peripheral rim 82 provided with uniformly spaced light reflective and light absorbent areas 83 and 84 which are illuminated by light emitting diode 85 and reflectively sensed by phototransistor 86.

FIG. 6 shows another embodiment of transducer means in which the armature disk 91 is made of a magnetically permeable material and is provided with uniformly spaced peripheral teeth 92 adjacent a magnet rod 93 supported by a sensing element body member 94. A coil of fine wire 95 is wrapped around rod 93, whereby a small current is induced in the coil by the passage of each successive tooth past the end of the rod. If desired, amplifier means and/or the same type of square wave generating circuit described above can also be incorporated within the body member of this sensing element, which is likewise compatible with conventional readout equipment.

The invention has been described with particular reference to illustrative embodiments thereof, but it will be understood that variations and modifications can be effected within the spirit and scope of the invention as described hereinabove and as defined in the appended claims.

I claim:

1. A rotary seal shaft rotation transducer device comprising
   a. a spindle member adapted to be affixed coaxially to an end of a rotatable shaft for rotation therewith, said spindle member including a first internal passageway in leak tight communication with a second internal passageway in said shaft when said spindle member is affixed thereto;
   b. a housing;
   c. bearing means carried by said spindle member and supporting said housing to allow said housing to remain stationary while said shaft and said spindle member rotate together;
   d. a seal member carried by said housing in nonrotatable relation thereto and including a third internal passageway, said seal member being adapted to cooperate with said spindle member to establish substantially leak tight communication between said first and third internal passageways;
   e. rotatable armature means supported by said spindle member for rotation therewith; and
   f. transducer means supported by said housing in non-rotatable relation thereto and adapted to cooperate with said armature means to provide an output signal functionally related to rotational movement of said spindle member.

2. A device according to claim 1 in which said body member defines an internal chamber substantially enclosing said armature means.

3. A device according to claim 1 in which said transducer means comprises an integral sub-assembly removable from said device without disturbing other operative components thereof.

4. A device according to claim 1 in which said transducer means comprises a light source and a photoresponsive element adapted to produce an electrical signal in response to being illuminated by said light source, said armature means being adapted to modulate the illumination of said photoresponsive element by said light source as a function of rotational movement of said armature means.

5. A device according to claim 4 in which said armature means comprises a circular member provided with a uniform circular array of alternate light transmissive and light blocking areas positioned between said light source and said photoresponsive element to cause said photoresponsive element to produce an electrical signal that is pulsed at a frequency representative of the rotational speed of said spindle.

6. A device according to claim 4 in which said armature means comprises a circular member provided with a uniform circular array of alternate light reflective and light absorbent areas positioned at a reflective position along a reflected optical ray path between said light source and said photoresponsive element to cause said photoresponsive element to produce an electrical signal that is pulsed at a frequency representative of the rotational speed of said spindle.

7. A device according to claim 4 in which said transducer means includes pulse shaping circuitry for producing substantially square wave signal pulses in response to pulsated illumination of said photoresponsive element by said light source produced by rotational movement of said armature means.

8. A device according to claim 7 in which said pulse shaping circuitry, said light source and said photoresponsive element are incorporated in a unitary sub-assembly adapted to be removed from said device as an integral unit.

9. A device according to claim 1 including means for producing a magnetic field, said armature means comprising a circular member provided about its periphery with uniformally arrayed structures capable of modulating said magnetic field adjacent said transducer means, said transducer means being adapted to detect such modulations of said magnetic field by said armature member adjacent said transducer means and to produce a corresponding electrical output signal.

* * * * *